(12) United States Patent
Park et al.

(10) Patent No.: US 12,057,597 B2
(45) Date of Patent: Aug. 6, 2024

(54) BATTERY PACK INCLUDING THERMAL SPREAD INHIBITION STRUCTURE

(71) Applicant: LG ENERGY SOLUTION, LTD., Seoul (KR)

(72) Inventors: Jin Yong Park, Daejeon (KR); Young Bum Cho, Daejeon (KR); Jeong Oh Moon, Daejeon (KR); Hyeon Ki Yun, Daejeon (KR); Eun Gyu Shin, Daejeon (KR); Ho June Chi, Daejeon (KR); Kyung Woo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/914,117

(22) PCT Filed: Nov. 16, 2021

(86) PCT No.: PCT/KR2021/016708
§ 371 (c)(1),
(2) Date: Sep. 23, 2022

(87) PCT Pub. No.: WO2022/108291
PCT Pub. Date: May 27, 2022

(65) Prior Publication Data
US 2024/0047783 A1     Feb. 8, 2024

(30) Foreign Application Priority Data
Nov. 23, 2020  (KR) .................. 10-2020-0157822

(51) Int. Cl.
*H01M 50/383*   (2021.01)
*A62C 3/16*     (2006.01)
(Continued)

(52) U.S. Cl.
CPC ............ *H01M 50/383* (2021.01); *A62C 3/16* (2013.01); *A62C 35/10* (2013.01);
(Continued)

(58) Field of Classification Search
CPC .................................................. H01M 50/383
See application file for complete search history.

(56) References Cited

U.S. PATENT DOCUMENTS

| 2013/0011701 A1 | 1/2013 | Petzinger |
| 2014/0170447 A1 | 6/2014 | Woehrle et al. |

(Continued)

FOREIGN PATENT DOCUMENTS

| CN | 210873833 U | 6/2020 |
| CN | 211208621 U | 8/2020 |

(Continued)

OTHER PUBLICATIONS

International Search Report (PCT/ISA/210) issued in PCT/KR2021/016708, dated Mar. 2, 2022.

*Primary Examiner* — Brian R Ohara
(74) *Attorney, Agent, or Firm* — Birch, Stewart, Kolasch & Birch, LLP

(57) ABSTRACT

A battery pack includes a battery cell stack formed by a plurality of stacked battery cells, a battery module housing configured to wrap the other outer surfaces of the battery cell stack excluding a first surface and a second surface, from which electrode leads protrude, a water tank configured to supply a coolant to the battery cell or the battery module housing, and a battery pack case configured to receive a plurality of battery module housings. The battery pack case includes a pack case space portion located adjacent to the first surface and a crossbeam located adjacent to the second (Continued)

surface, whereby, when fire breaks out in the battery cell, it is possible to rapidly and accurately prevent spread of flames of the ignited battery cell.

13 Claims, 14 Drawing Sheets

(51) Int. Cl.
| | |
|---|---|
| A62C 35/10 | (2006.01) |
| H01M 10/613 | (2014.01) |
| H01M 10/6567 | (2014.01) |
| H01M 50/211 | (2021.01) |
| H01M 50/258 | (2021.01) |
| H01M 50/682 | (2021.01) |

(52) U.S. Cl.
CPC ..... *H01M 10/613* (2015.04); *H01M 10/6567* (2015.04); *H01M 50/211* (2021.01); *H01M 50/258* (2021.01); *H01M 50/682* (2021.01); *H01M 2200/10* (2013.01)

(56) References Cited

U.S. PATENT DOCUMENTS

| | | |
|---|---|---|
| 2016/0315361 A1 | 10/2016 | Petzinger |
| 2017/0110695 A1 | 4/2017 | Nishikawa et al. |
| 2018/0026243 A1* | 1/2018 | Stojanovic .............. B60L 58/21 429/99 |
| 2019/0181405 A1* | 6/2019 | Kim .................. H01M 10/6556 |
| 2019/0267682 A1 | 8/2019 | Seo et al. |
| 2019/0305391 A1 | 10/2019 | Petzinger |
| 2019/0312322 A1 | 10/2019 | Ahn et al. |
| 2020/0076025 A1 | 3/2020 | Jo et al. |
| 2020/0185672 A1 | 6/2020 | Seo et al. |
| 2020/0411930 A1 | 12/2020 | Park et al. |
| 2021/0313633 A1 | 10/2021 | Petzinger |
| 2021/0344074 A1 | 11/2021 | Jung et al. |

FOREIGN PATENT DOCUMENTS

| | | |
|---|---|---|
| JP | 2011-254906 A | 12/2011 |
| JP | 2012-252909 A | 12/2012 |
| JP | 2014-517986 A | 7/2014 |
| JP | 2014-523622 A | 9/2014 |
| JP | 2015-207553 A | 11/2015 |
| JP | 2019-536214 A | 12/2019 |
| JP | 2020-21705 A | 2/2020 |
| KR | 10-2013-0078953 A | 7/2013 |
| KR | 10-2018-0010989 A | 1/2018 |
| KR | 10-2018-0083140 A | 7/2018 |
| KR | 10-2018-0112617 A | 10/2018 |
| KR | 10-2019-0064887 A | 6/2019 |
| KR | 10-2019-0069873 A | 6/2019 |
| KR | 10-2065099 B1 | 1/2020 |
| KR | 10-2020-0031930 A | 3/2020 |
| KR | 10-2020-0104143 A | 9/2020 |

* cited by examiner

【FIG. 1A】
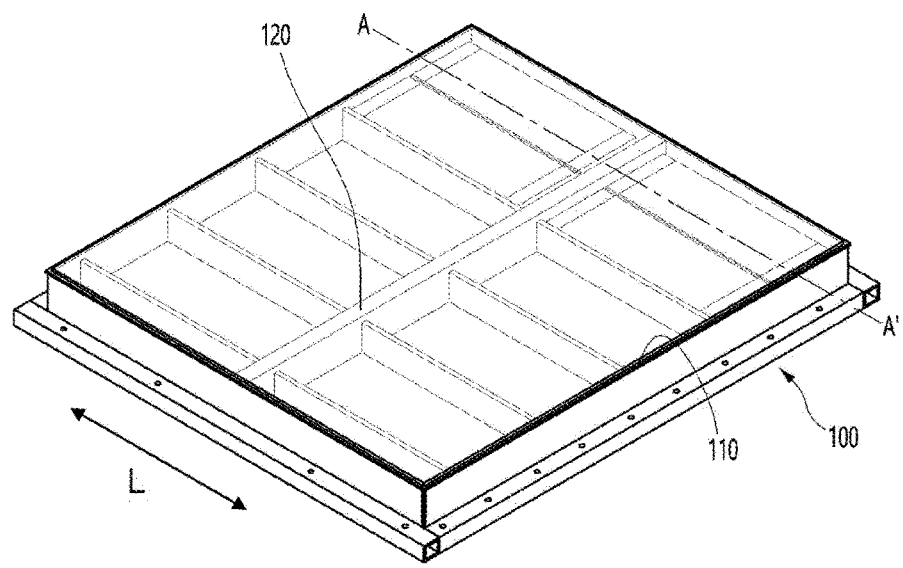
【FIG. 1B】
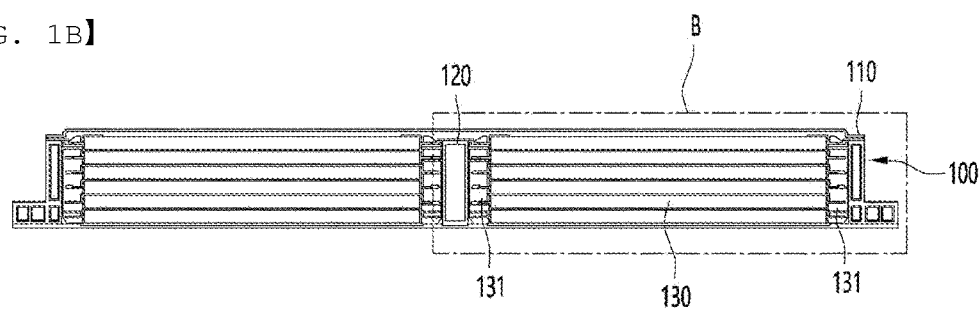
【FIG. 1C】
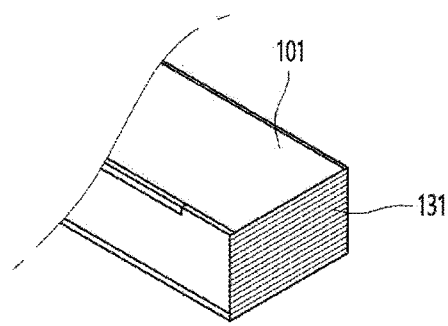

[FIG. 2]
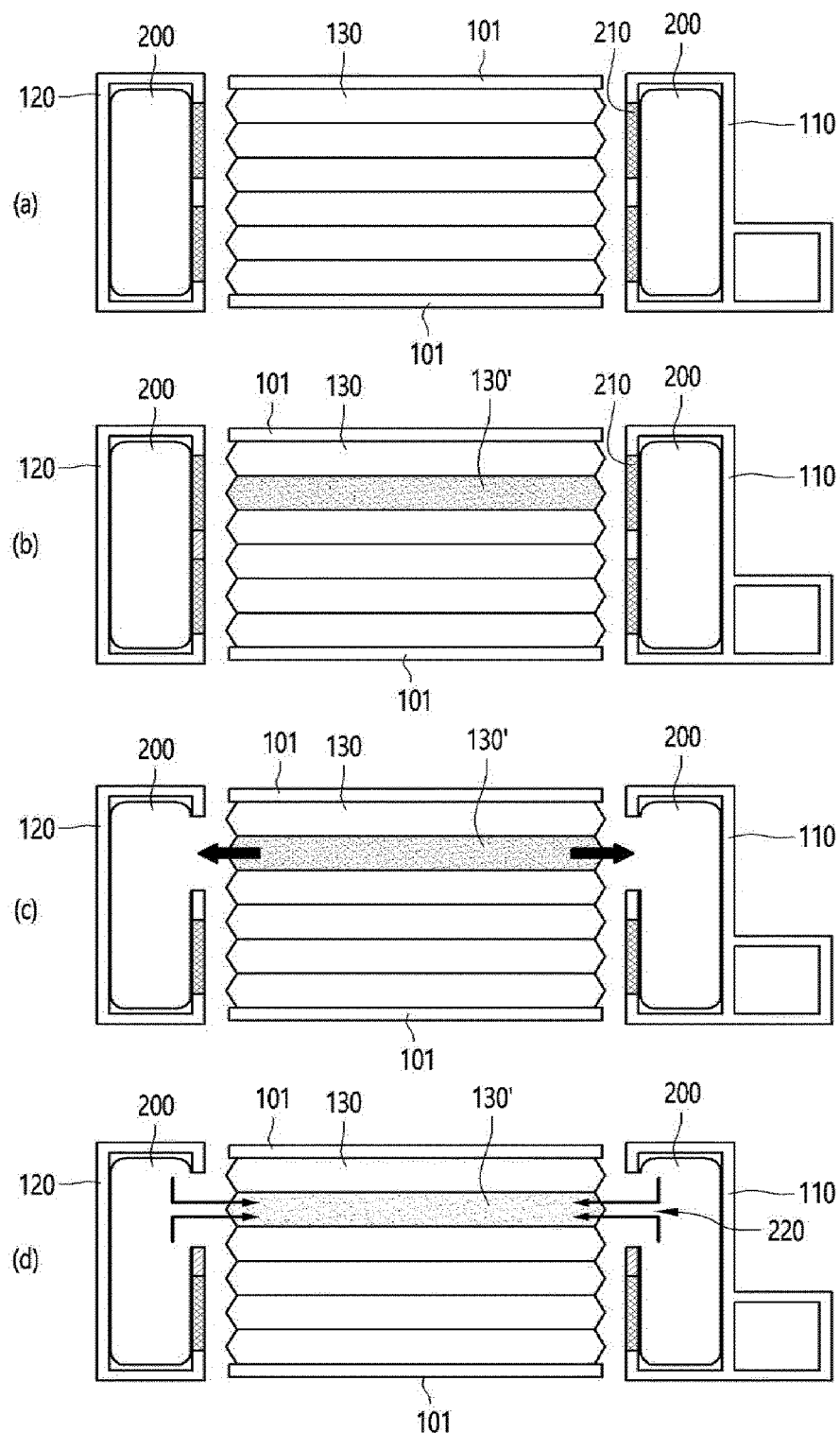

[FIG. 3A]
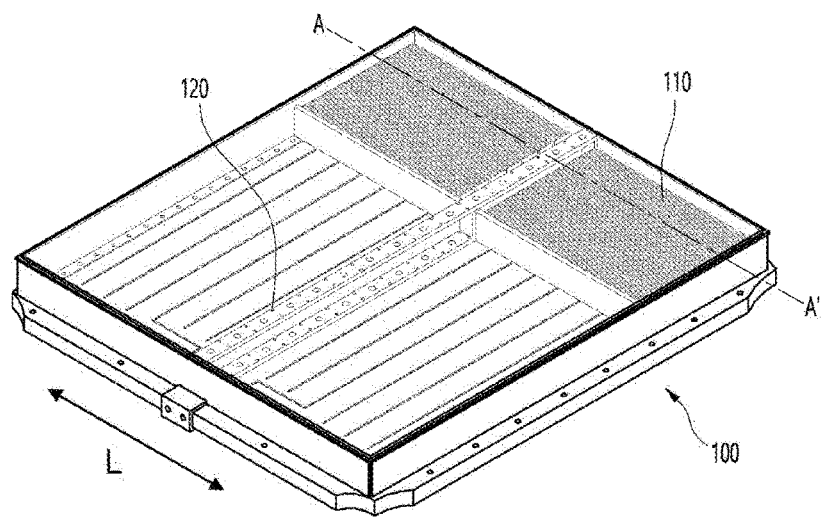
[FIG. 3B]
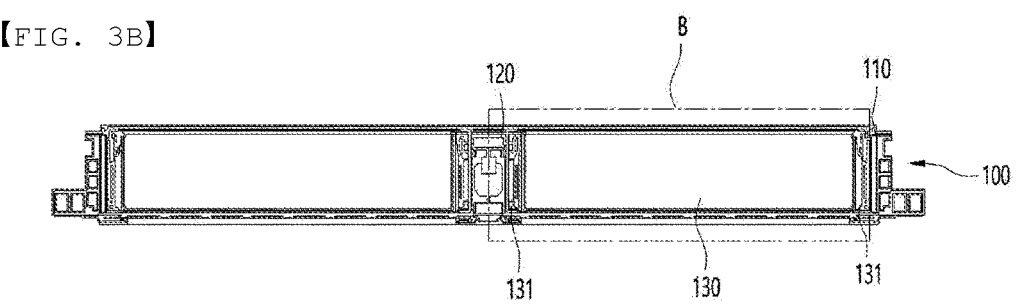
[FIG. 3C]
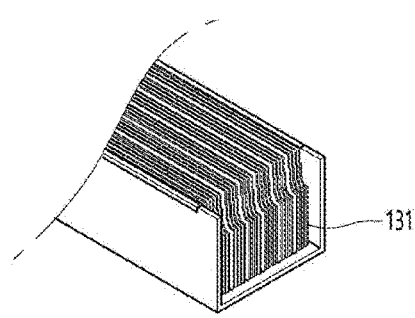

[FIG. 4]
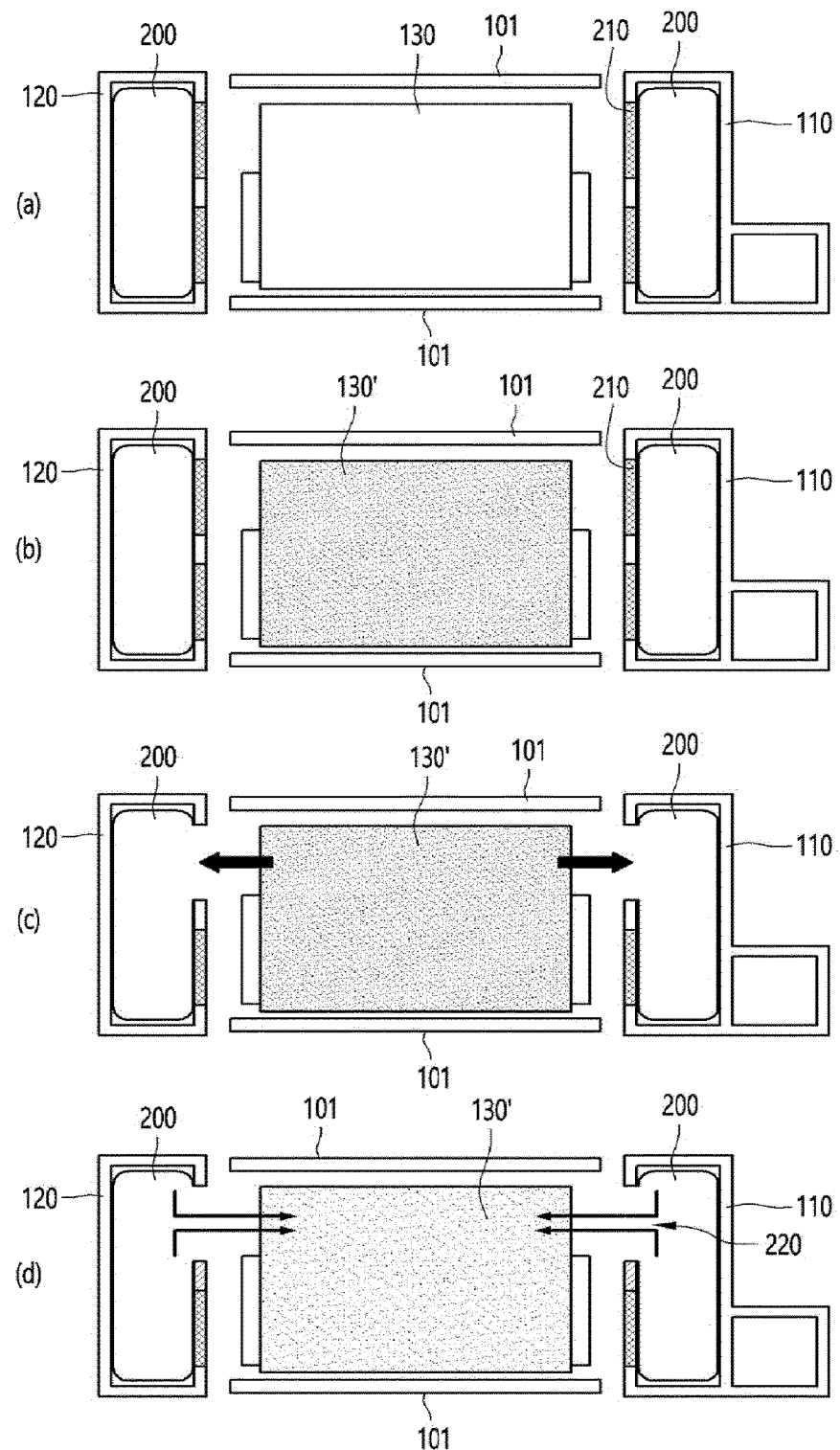

[FIG. 5A]
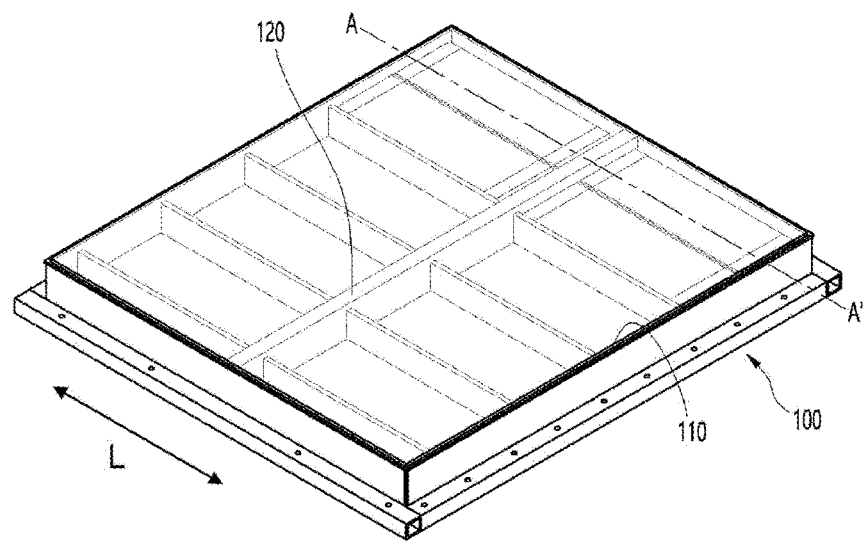
[FIG. 5B]
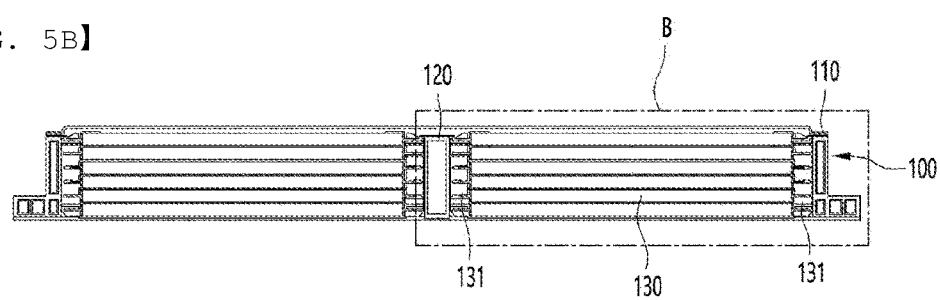
[FIG. 5C]
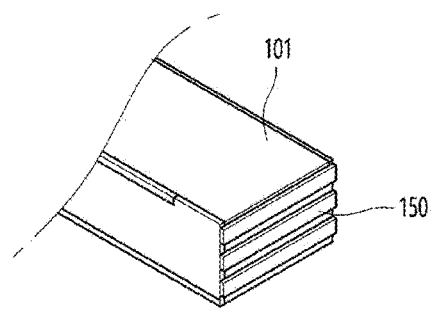

【FIG. 6A】
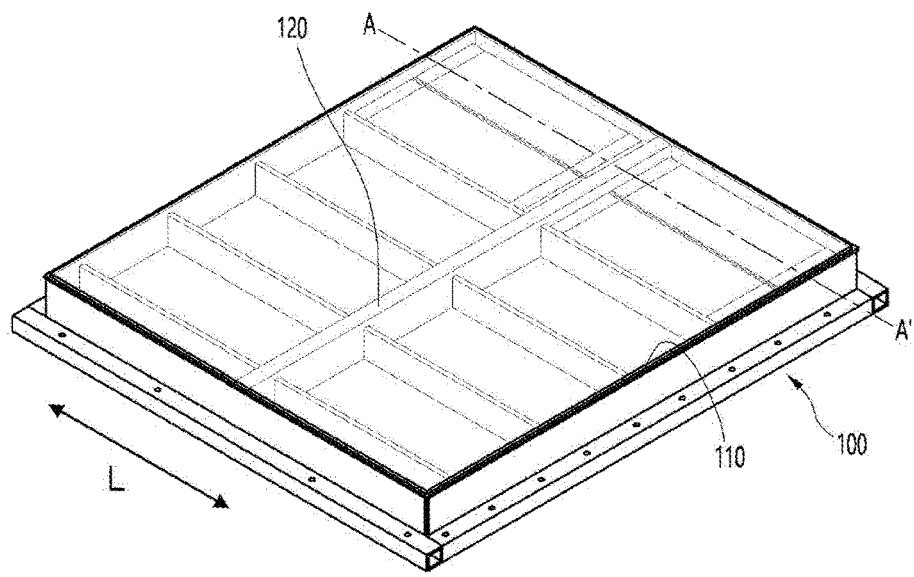
【FIG. 6B】
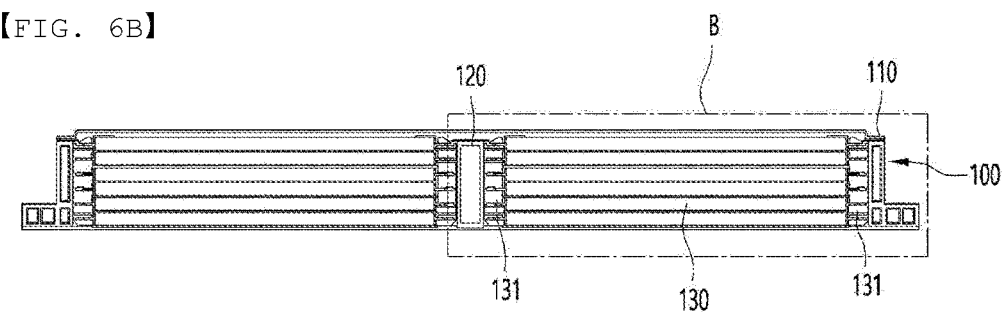
【FIG. 6C】
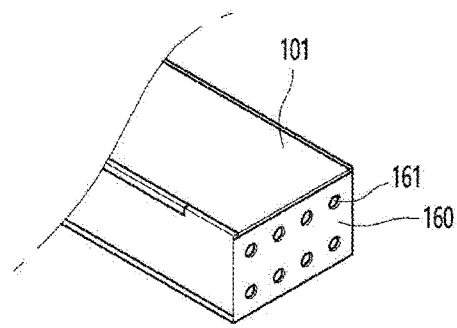

[FIG. 7]
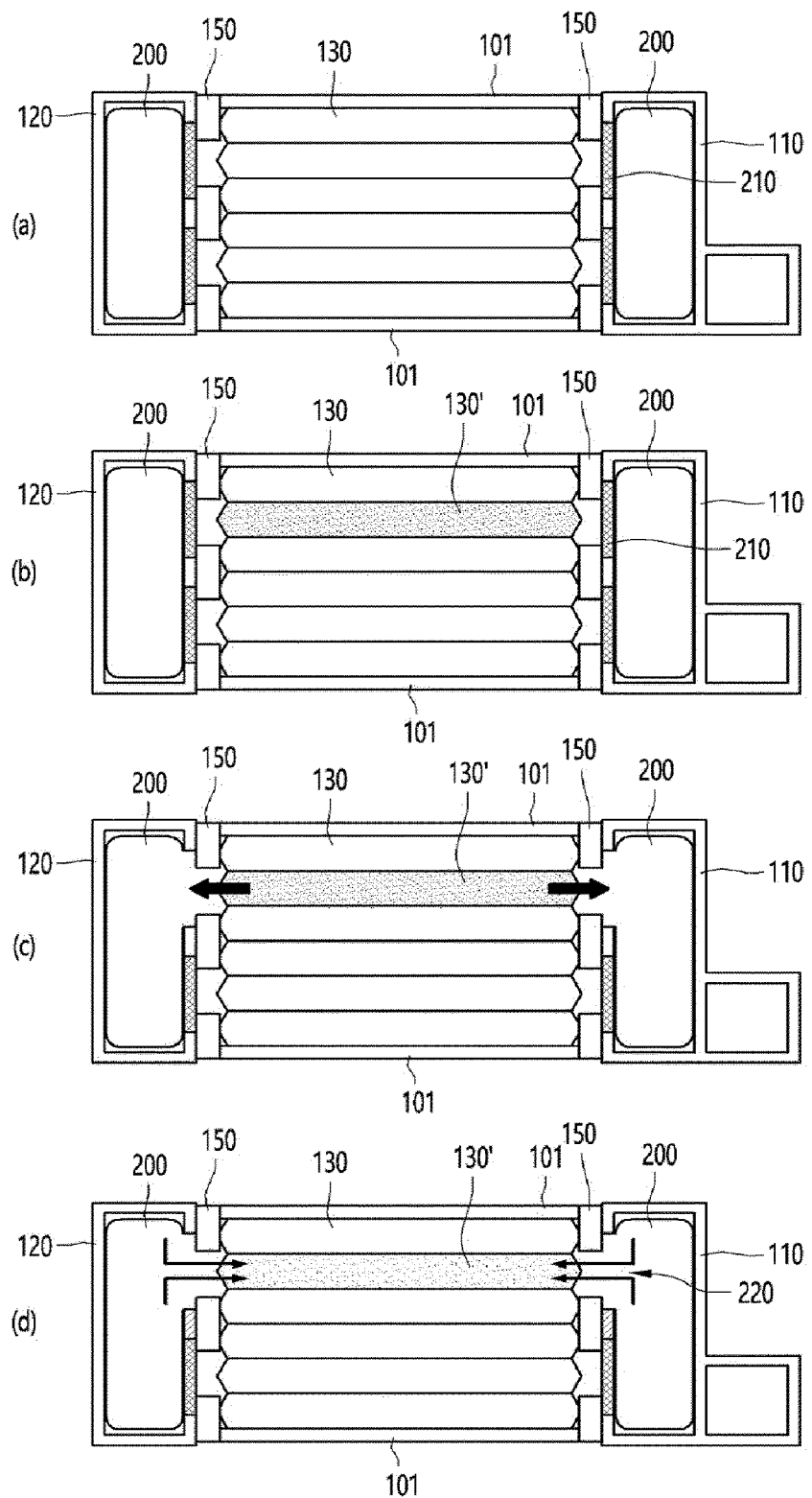

[FIG. 8A]
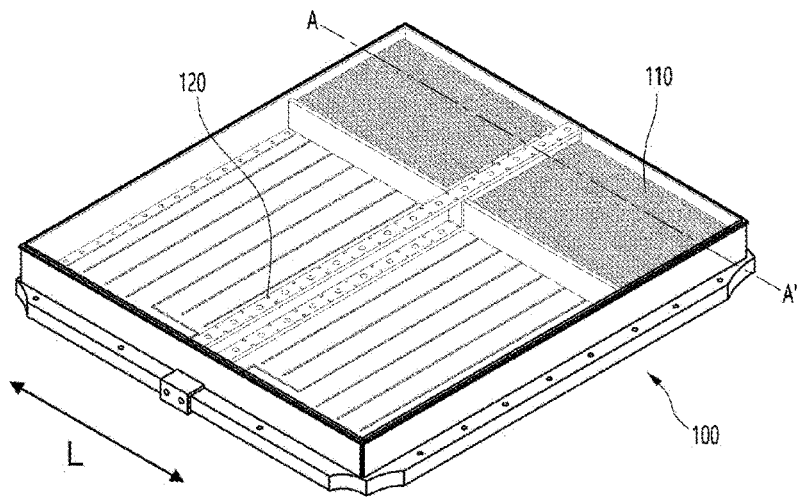
[FIG. 8B]
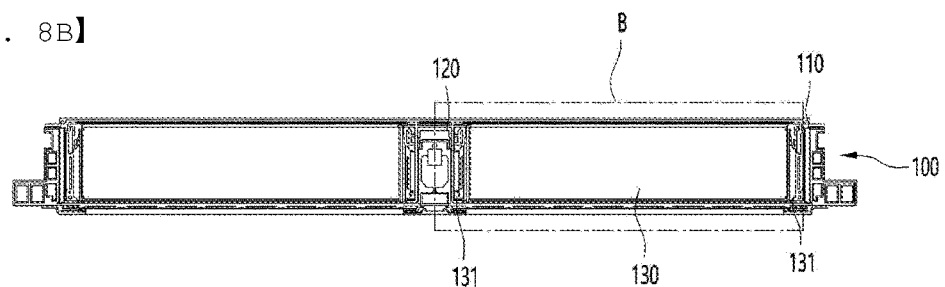
[FIG. 8C]
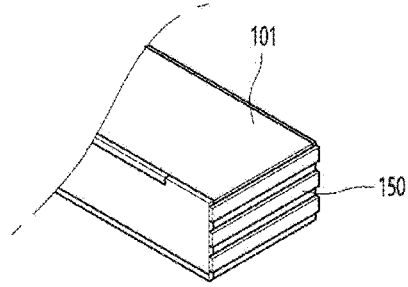

[FIG. 9A]
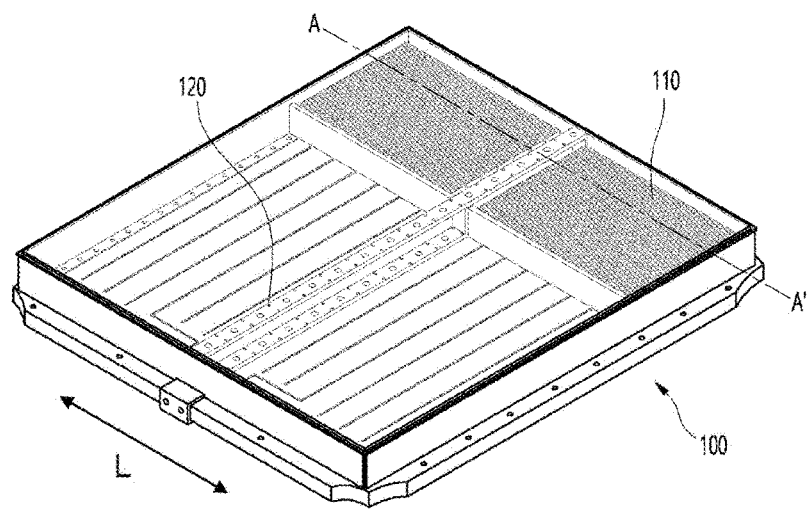
[FIG. 9B]
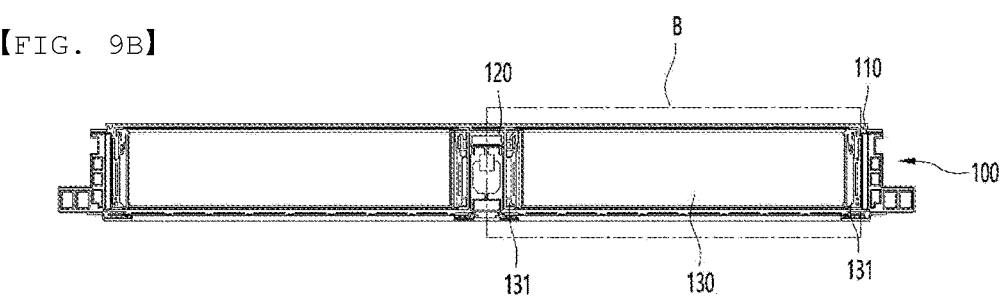
[FIG. 9C]
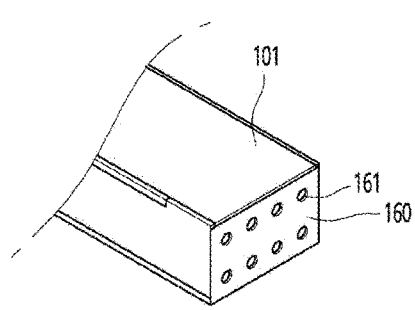

[FIG. 10]
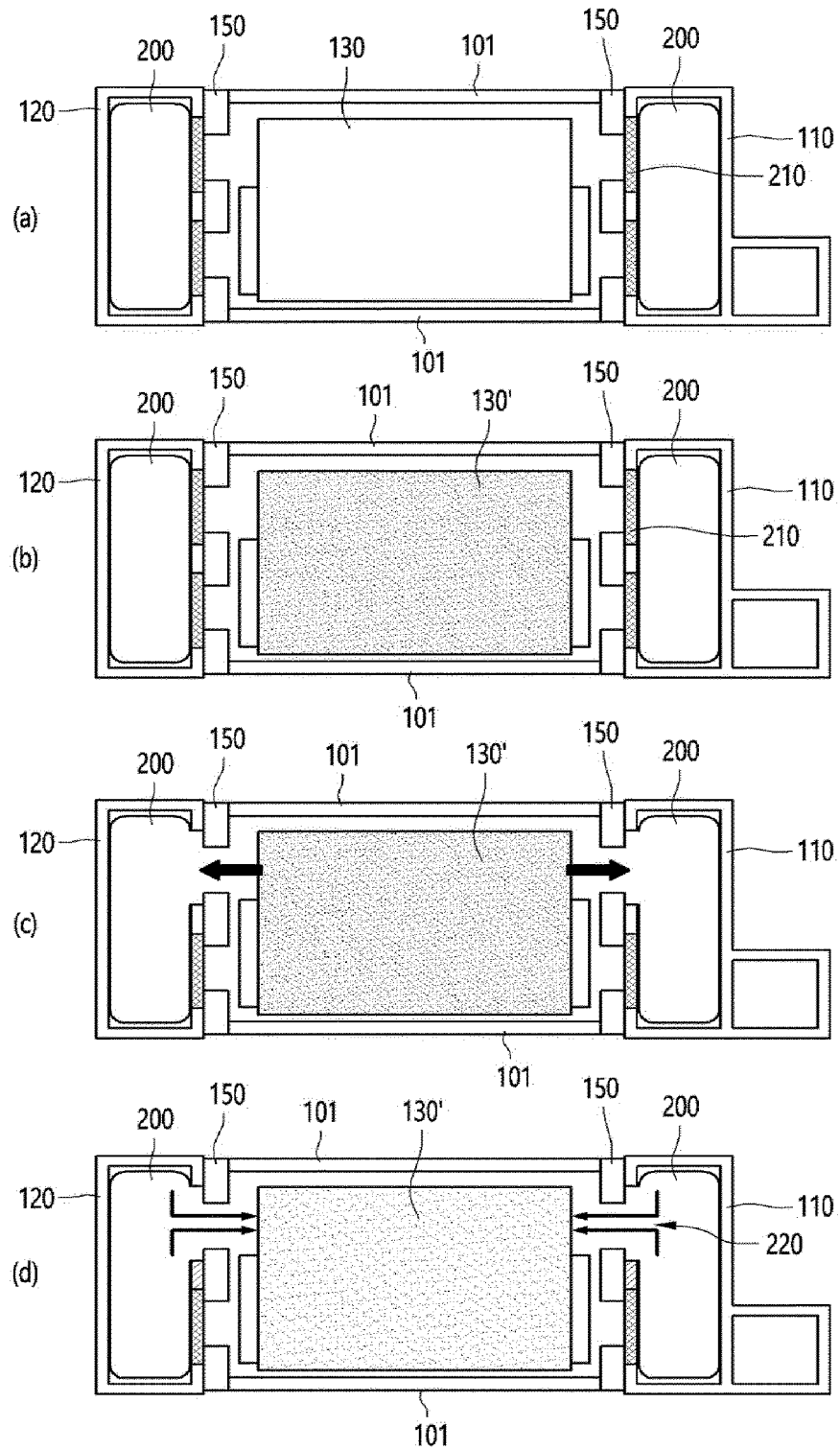

[FIG. 11A]
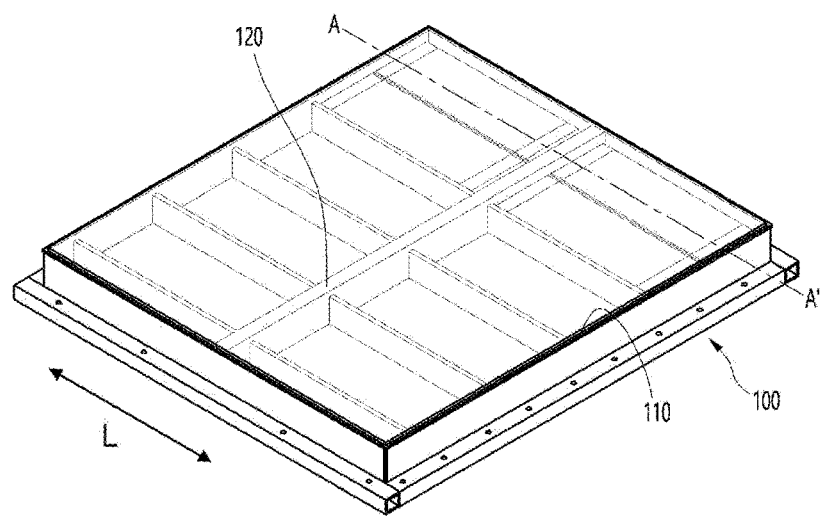
[FIG. 11B]
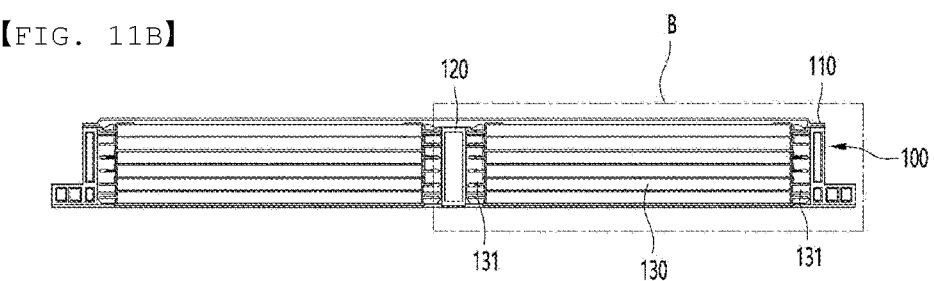
[FIG. 11C]
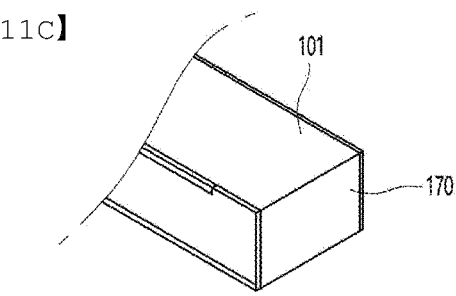

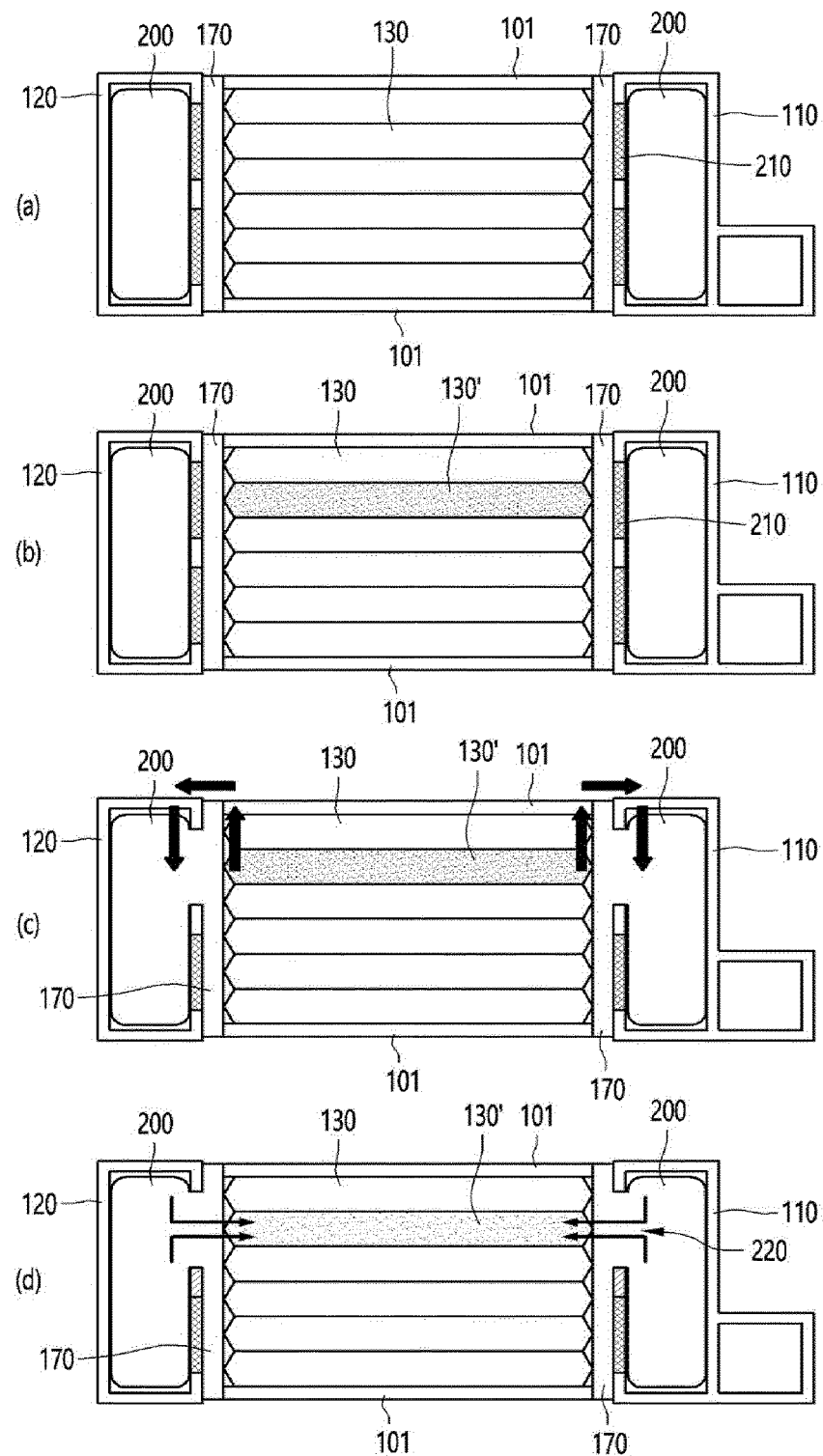
[FIG. 12]

【FIG. 13A】
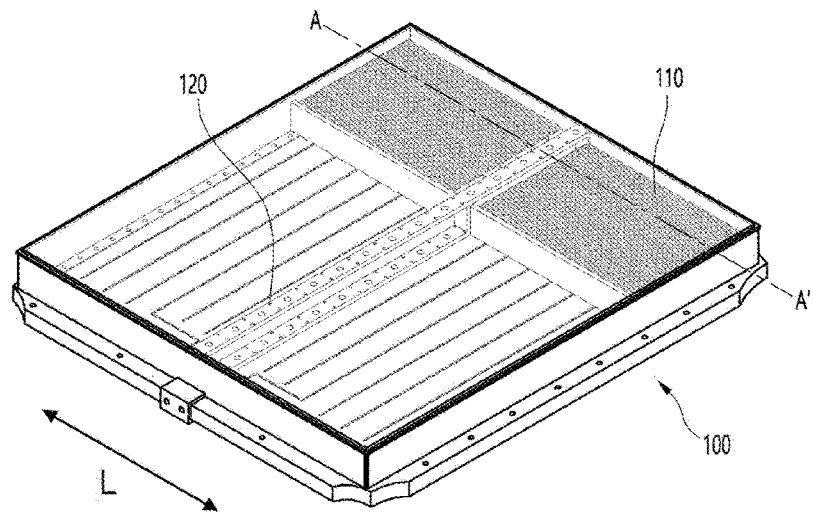
【FIG. 13B】
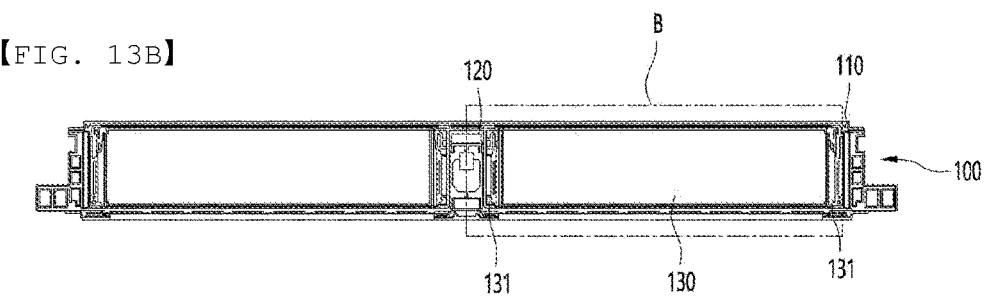
【FIG. 13C】
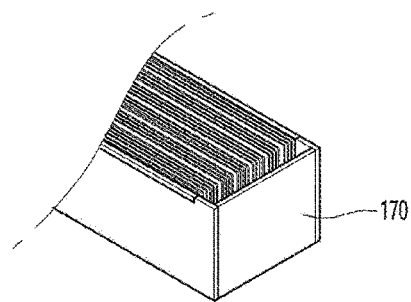

[FIG. 14]
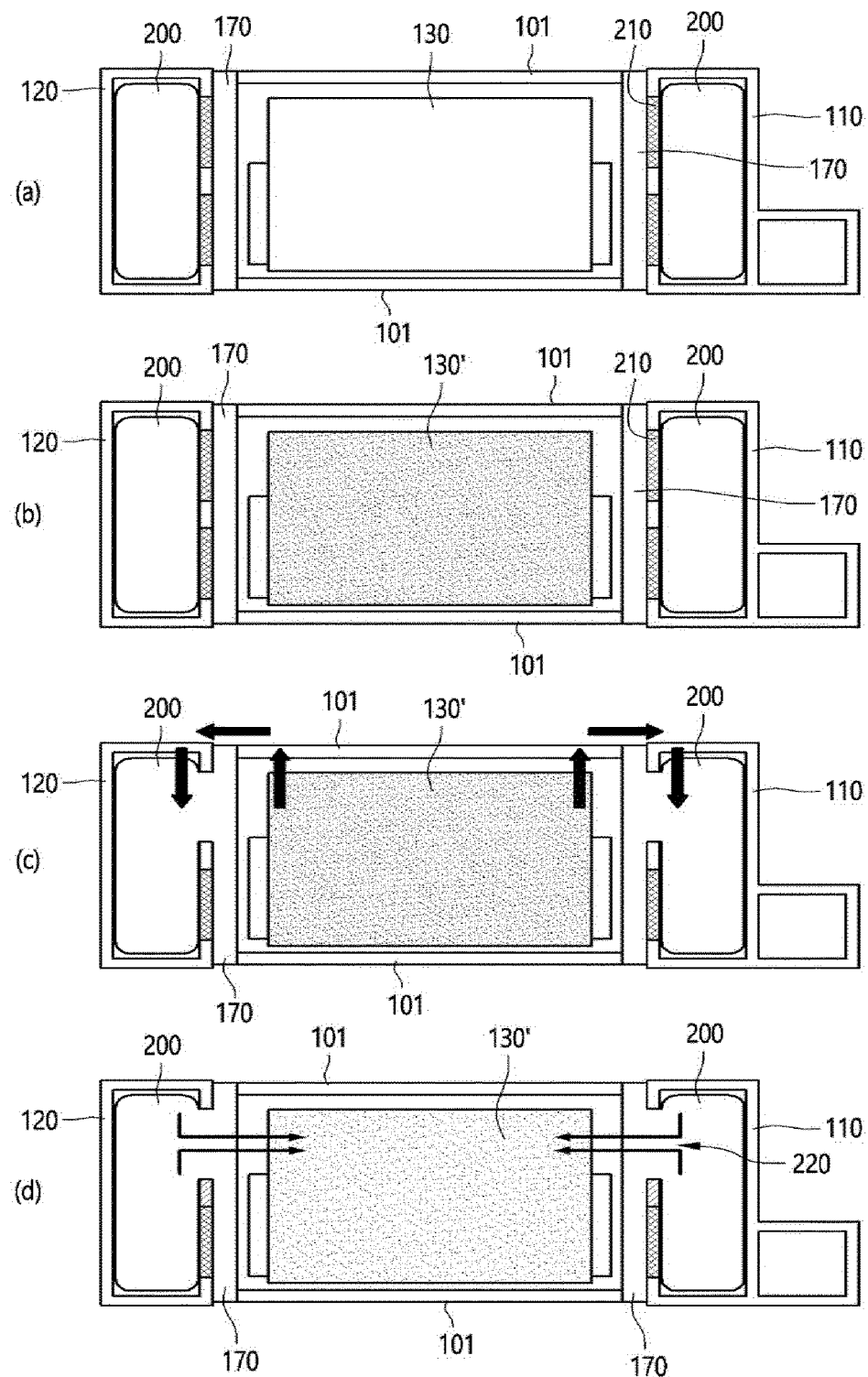

BATTERY PACK INCLUDING THERMAL SPREAD INHIBITION STRUCTURE

TECHNICAL FIELD

This application claims the benefit of priority to Korean Patent Application No. 2020-0157822 filed on Nov. 23, 2020, the disclosure of which is incorporated herein by reference in its entirety.

The present invention relates to a battery pack including a thermal spread inhibition structure. More particularly, the present invention relates to a battery pack including a thermal spread inhibition structure capable of directly injecting a coolant into an ignited battery cell or a battery module housing including the ignited battery cell in order to prevent spread of flames of the ignited battery cell in the battery pack.

BACKGROUND ART

As the result of continuous research and development of a lithium secondary battery, it has been possible to manufacture and commercialize a lithium secondary battery having increased capacity and improved output. In addition, demand for the lithium secondary battery as an energy source replaceable fossil fuels, which cause environmental pollution, has increased.

Accordingly, application of the lithium secondary battery to various devices has increased. For example, the lithium secondary battery has been widely used as an energy source for wireless mobile devices, which are small multifunctional products, and wearable devices, which are worn on the body, and has also been used as an energy source for electric vehicles and hybrid electric vehicles presented as alternatives to existing gasoline and diesel vehicles or as an energy storage system (ESS).

As the lithium secondary battery is used as a large-capacity, high-output energy source, as described above, securing safety of the lithium secondary battery becomes an important subject of interest.

Generally, in the case in which fire breaks out in a battery cell received in the energy storage system, a method of injecting water into a battery module or a battery pack through a separate watering device is used.

In this case, however, facilities and space for the watering device are required, and the fire may spread due to a time difference between sensing time of gas discharged due to venting of the battery cell and watering time.

Alternatively, a method of disposing an insulating material or a fire extinguishing agent inside or outside the battery module or the battery pack in order to interrupt heat transfer between battery cells or to cool the ignited battery cell may be used.

In the case in which the insulating material is used, however, a fire extinguishing function is not performed although propagation of flames is interrupted. In the case in which the fire extinguishing agent is used, the fire extinguishing agent is not exactly spread to the point at which fire breaks out, since the fire extinguishing agent is disposed in an empty space in the battery pack in consideration of energy density.

Patent Document 1 is configured such that a middle case and an inner case are received in an outer case, a plurality of cells is received in the middle case, a fire extinguishing agent is received in the inner case, and when the cells generate heat to an upper limit temperature or higher, the fire extinguishing agent is introduced into the middle case through an injection pipe. When the cells generate heat to an upper limit temperature or higher, the injection pipe is opened, whereby the fire extinguishing agent received in the inner case is injected into the middle case.

In Patent Document 1, compressed gas for spraying the fire extinguishing agent, a nozzle used as the injection pipe, and the inner case configured to receive the fire extinguishing agent are included, whereby an additional space therefor is necessary, and expense necessary to purchase the fire extinguishing agent and the compressed gas is also further incurred.

Therefore, there is a high necessary for technology capable of minimizing spread of flames and preventing a decrease in energy density without needing an additional space when fire breaks out in a battery cell received in a battery pack.

PRIOR ART DOCUMENTS (Patent Document 1) Japanese Patent Application Publication No. 2012-252909 (2012.12.20)

DISCLOSURE

Technical Problem

The present invention has been made in view of the above problems, and it is an object of the present invention to provide a battery pack including a fire extinguishing and thermal spread inhibition structure capable of extinguishing ignition of a battery cell when the battery cell catches fire or explodes and preventing spread of flames to battery cells adjacent thereto.

Technical Solution

In order to accomplish the above object, a battery pack according to the present invention includes a plurality of battery cell stacks, each battery cell stack constituted by a plurality of stacked battery cells and having a top surface, a bottom surface and a pair of end surfaces; a plurality of battery module housings, each battery module housing having a top surface, a bottom surface and a pair of end surfaces configured to wrap the, top surface, the bottom surface and the pair of end surfaces of a respective one of the plurality of battery cell stacks; a water tank configured to supply a coolant to at least one of the plurality of battery module housings; and a battery pack case configured to receive the plurality of battery module housings, wherein the battery pack case includes a pack case space portion located adjacent to a first side of a first battery module housing of the plurality of battery module housings.

In the battery pack according to the present invention, each battery cell stack may be disposed such that bottoms of electrode assembly receiving portions are parallel to a lower surface of the battery pack case.

In the battery pack according to the present invention, each battery cell stack may be disposed such that the bottoms of electrode assembly receiving portions are perpendicular to the lower surface of the battery pack case.

In the battery pack according to the present invention, the water tank may include a first water tank and a second water tank, and the pack case space portion may include the first water tank and the crossbeam may include the second water tank.

In the battery pack according to the present invention, a through-hole may be formed in each of one surface of the pack case space portion that faces the first side of the first battery module housing and one surface of the crossbeam that faces the second side of the first battery module housing, and a sealing member may be added to the through-hole.

In the battery pack according to the present invention, the sealing member may be made of a material that is melted by high-temperature gas or sparks discharged from the first battery module housing.

In the battery pack according to the present invention, each through-hole may be opened as the result of melting of the sealing member, and a coolant in the water tank may be sprayed through each through-hole.

In the battery pack according to the present invention, each through-hole may be a plurality of holes formed so as to be uniformly dispersed.

In the battery pack according to the present invention, at least a portion of each of the first side of the first battery module housing and the second side of the first battery module housing may be open.

In the battery pack according to the present invention, a separation space may be formed between the first battery module housing and the pack case space portion or between the first battery module housing and the crossbeam.

In the battery pack according to the present invention, a metal band may be added to each of the first side of the first battery module housing and the second side of the first battery module housing.

In the battery pack according to the present invention, an end cover may be added to each of the first side of the first battery module housing and the second side of the first battery module housing, and an opening may be formed in the end cover.

In the battery pack according to the present invention, an end cover may be added to each of the first side of the first battery module housing and the second side of the first battery module housing, and the battery module housing may be hermetically sealed by the end covers.

Advantageous Effects

As is apparent from the above description, a battery pack according to the present invention has a water tank disposed therein, whereby it is possible to rapidly cool an ignited battery cell without increasing the external size of the battery pack, and therefore it is possible to securely inhibit a thermal runaway phenomenon of the battery cell.

Also, in the case in which a hermetically sealed battery module housing is included, it is possible to supply a coolant to the outer surface of a battery module housing including the ignited battery cell, whereby it is possible to prevent high thermal energy from being transferred to battery modules adjacent thereto.

In addition, the water tank is configured such that the coolant is received in a crossbeam and a pack case space portion, a through-hole is formed in one surface of each of the crossbeam and the pack case space portion, and the through-hole is filled with a sealing member, whereby it is possible to minimize an increase in overall weight of the battery pack due to addition of the sealing member.

In addition, even though fire breaks out in any one of battery cells constituting a battery cell stack, it is possible to exactly inject the coolant into the ignited battery cell. Even when the present invention is applied to a large-capacity battery pack, therefore, it is possible to obtain a thermal spread interruption effect.

Also, in the case in which water is used as the coolant instead of a fire extinguishing agent, it is possible to reduce production cost.

Since a space in the crossbeam used to improve structural safety of the battery pack is used as the water tank, space utilization is improved.

DESCRIPTION OF DRAWINGS

FIGS. 1A-1C are a perspective view and a sectional view of a battery pack according to a first embodiment with a partial perspective view of a battery module.

FIG. 2 is an enlarged view of part B of FIG. 1B, schematically illustrating a situation in which thermal spread is inhibited when fire breaks out in the battery pack according to the first embodiment.

FIGS. 3A-3C are a perspective view and a sectional view of a battery pack according to a second embodiment with a partial perspective view of a battery module.

FIG. 4 is an enlarged view of part B of FIG. 3B, schematically illustrating a situation in which thermal spread is inhibited when fire breaks out in the battery pack according to the second embodiment.

FIGS. 5A-5C are a perspective view and a sectional view of a battery pack according to a third embodiment with a partial perspective view of a battery module.

FIGS. 6A-6C are a perspective view and a sectional view of a battery pack according to a fourth embodiment with a partial perspective view of a battery module.

FIG. 7 is an enlarged view of part B of FIG. 5B, schematically illustrating a situation in which thermal spread is inhibited when fire breaks out in the battery pack according to the third embodiment.

FIGS. 8A-8C are a perspective view and a sectional view of a battery pack according to a fifth embodiment with a partial perspective view of a battery module.

FIGS. 9A-9C are a perspective view and a sectional view of a battery pack according to a sixth embodiment with a partial perspective view of a battery module.

FIG. 10 is an enlarged view of part B of FIG. 8B, schematically illustrating a situation in which thermal spread is inhibited when fire breaks out in the battery pack according to the fifth embodiment.

FIGS. 11A-11C are a perspective view and a sectional view of a battery pack according to a seventh embodiment with a partial perspective view of a battery module.

FIG. 12 is an enlarged view of part B of FIG. 11B, schematically illustrating a situation in which thermal spread is inhibited when fire breaks out in the battery pack according to the seventh embodiment.

FIGS. 13A-13C are a perspective view and a sectional view of a battery pack according to an eighth embodiment with a partial perspective view of a battery module.

FIG. 14 is an enlarged view of part B of FIG. 13B, schematically illustrating a situation in which thermal spread is inhibited when fire breaks out in the battery pack according to the eighth embodiment.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

FIGS. 1A-1C are a perspective view and a sectional view of a battery pack according to a first embodiment with a partial perspective view of a battery module, and FIG. 2 is an enlarged view of part B of FIG. 1B, schematically illustrating steps A-D in which thermal spread is inhibited when fire breaks out in the battery pack according to the first embodiment.

Referring to FIGS. 1A-C and 2, the battery pack according to the first embodiment includes a battery cell stack constituted by a plurality of stacked battery cells 130, a battery module housing 101 configured to wrap the other outer surfaces of the battery cell stack excluding a first surface and a second surface, which are opposite end surfaces in an overall length direction thereof L, a water tank 200 configured to supply a coolant to the battery cell 130, and a battery pack case 100 configured to receive a plurality of battery module housings, wherein the battery pack case 100 includes a pack case space portion 110 located adjacent to the first surface and a crossbeam 120 located adjacent to the second surface.

The battery cell 130 of FIGS. 1A-C and 2 may be a bidirectional pouch-shaped battery cell having a positive electrode lead and a negative electrode lead protruding in opposite directions or a unidirectional pouch-shaped battery cell having a positive electrode lead and a negative electrode lead protruding in the same direction. Even though the battery cell shown in FIGS. 1A-C is shown as a bidirectional battery cell having electrode leads 131 protruding in different directions, therefore, the shape of the pouch-shaped battery cell included in the present invention is not limited thereto. The plurality of battery cells 130 constituting the battery cell stack are stacked such that bottoms of electrode assembly receiving portions are parallel to a lower surface of the battery pack case.

The battery pack shown in FIG. 1A is configured to have a structure in which eight battery modules 140 are received in a 2×4 matrix, and a crossbeam 120 is disposed between the first battery module row and the second battery module row to improve structural safety of the battery pack case.

In the battery pack according to the present invention, however, the number or position of the battery modules is not limited to the number or position shown in FIG. 1A, and may be freely changed in consideration of desired capacity and output amount of the battery pack.

When a battery cell constituted by a lithium secondary battery is defective, overcharged, or overheated, a thermal runaway phenomenon occurs in the battery cell. When the battery cell is in a thermal runaway state, the temperature of the battery cell may rise up to a temperature at which gas venting occurs, e.g. about 260° C. In addition, the temperature of the battery cell may be continuously increased while gas venting occurs.

In the case in which a plurality of battery cells is received in a battery pack case to manufacture a battery pack, when one battery cell is in a thermal runaway state, heat and flames may be transferred to a battery cell adjacent thereto, whereby the adjacent battery cell may be overheated and may thus be in a thermal runaway state. The battery cell in the thermal runaway state may heat another battery cell adjacent thereto, whereby a thermal runaway chain reaction may occur. When a battery cell in a thermal runaway state is present in the battery pack case, therefore, thermal runaway of a plurality of battery cells may occur, and this may spread more widely, whereby great damage may be caused. In the case in which a plurality of battery cells is in a thermal runaway state, the battery cells may reach a temperature of about 1000° C. or higher, and this temperature is maintained until the battery cells are completely destroyed by fire, whereby a user may be in danger.

Consequently, it is very important to extinguish the ignited battery cell before flames and heat of the ignited battery cell spread to a battery cell adjacent thereto.

In the battery pack according to the present invention, therefore, at least a portion or the entirety of each of the first surface and the second surface of the battery module housing may be open. Specifically, a separation space may be formed between the battery cell stack and the pack case space portion or between the battery cell stack and the crossbeam.

A water tank containing a coolant is provided at a position adjacent to each of the first surface and the second surface, and a through-hole, through which the coolant flows out, is hermetically sealed by a sealing member having a low melting point. When fire breaks out in the battery cell, therefore, the sealing member adjacent thereto is melted to open the through-hole. Consequently, the coolant received in the water tank is introduced into the ignited battery cell through the through-hole.

The overheated or ignited pouch-shaped battery cell is rapidly extinguished or cooled through the above process, whereby it is possible to rapidly prevent spread of thermal runaway, and therefore it is possible to secure time necessary to extinguish flames of the battery cell using a watering facility located at the outside.

In addition, even though the battery pack according to the present invention is mounted at a position close to a user, e.g. in an electric vehicle, it is possible to rapidly extinguish flames of the battery cell, and therefore it is possible to secure user safety.

Specifically, the water tank 200 includes a first water tank and a second water tank. The pack case space portion 110 includes the first water tank, and the crossbeam 120 includes the second water tank.

For example, the first water tank may be provided in a separately partitioned space in the pack case space portion 110, and the second water tank may be provided in a separately partitioned space in the crossbeam.

Alternatively, the pack case space portion may contain a coolant therein, whereby the pack case space portion may function as the first water tank, and the crossbeam may contain a coolant therein, whereby the crossbeam may function as the second water tank.

A through-hole 220 is formed in each of one surface of the pack case space portion 110 that faces the first surface and one surface of the crossbeam 120 that faces the second surface, and a sealing member 210 is added to the through-hole 220 in order to hermetically seal the through-hole 220. The sealing member 210 is made of a material that is melted by high-temperature gas or sparks discharged from the battery cell 130. That is, when the battery cell 130 is in a normal state, the state in which the through-hole is hermetically sealed by the sealing member 210 is maintained. When the temperature of an ignited battery cell, e.g. a battery cell 130', exceeds the melting temperature of the sealing member 210, however, the sealing member 210 is melted, whereby the through-hole 220 is opened. Consequently, the coolant in the water tank 200 may be directly introduced into the battery cell.

The coolant received in the water tank 200 is evaporated by fire outbreak in the battery cell, whereby the volume of the coolant is increased and thus the coolant is transformed into a high pressure state. When the through-hole 220 is opened, therefore, the coolant may be sprayed toward the ignited battery cell at a high pressure.

At this time, the shape of the sealing member 210 that is not adjacent to the ignited battery cell 130' may be maintained without melting. Consequently, the coolant may be ejected through only the through-hole 220 from which the sealing member has been removed.

In consideration of the fact that the coolant is directly injected into the pouch-shaped battery cell, it is necessary to prevent flames of the pouch-shaped battery cell from expanding or to prevent explosion of the pouch-shaped battery cell due to injection of the coolant. Consequently, it is preferable for no combustible material to be used as an additive included in the coolant. Alternatively, in the case in which a combustible material is used as the additive, the additive may be added in an amount sufficient to prevent secondary explosion of the pouch-shaped battery cell and in such an amount that the additive is used as an antifreeze solution in order to prevent freezing of the coolant.

The sealing member may be made of a thermoplastic polymer resin having a melting point of about 200° C. or less. For example, a material having a melting point of about 100° C. to about 200° C., such as polyethylene or polypropylene, may be used as the thermoplastic polymer resin.

The through-hole 220 may be configured to have a structure in which a plurality of holes is uniformly dispersed. Even though fire breaks out in a certain battery cell, therefore, a sealing member located so as to be adjacent thereto may be melted.

The through-hole may have a size corresponding to the thickness of one battery cell. When the sealing member is removed and thus the through-hole is opened, the coolant may be sprayed to one battery cell. Alternatively, the through-hole may have a size corresponding to the sum of thicknesses of a plurality of battery cells. When the sealing member is removed and thus the through-hole is opened, the coolant may be sprayed to the plurality of battery cells.

The through-hole may be formed in a circular shape, a polygonal shape, a slit shape, or a lattice shape. Even though fire breaks out in a battery cell located at a certain position, therefore, the coolant may be directly injected into the ignited battery cell irrespective of the position of the battery cell. That is, the number of through-holes formed in the water tank may be set in consideration of the size and number of battery module housings and the shape, size, and number of battery cells disposed in the battery module housing.

FIGS. 3A-3C are a perspective view and a sectional view of a battery pack according to a second embodiment with a partial perspective view of a battery module, and FIG. 4 is an enlarged view of part B of FIG. 3B, schematically illustrating steps A-D in which thermal spread is inhibited when fire breaks out in the battery pack according to the second embodiment.

Referring to FIGS. 3A-C and 4, the battery pack includes a battery cell stack constituted by a plurality of stacked battery cells 130, a battery module housing 101 configured to wrap the other outer surfaces of the battery cell stack excluding a first surface and a second surface, which are opposite end surfaces in an overall length direction thereof L, a water tank 200 configured to supply a coolant to the battery cell 130, and a battery pack case 100 configured to receive a plurality of battery module housings, wherein the battery pack case 100 includes a pack case space portion 110 located adjacent to the first surface and a crossbeam 120 located adjacent to the second surface.

The battery cell 130 of FIGS. 3A-3C may be a bidirectional pouch-shaped battery cell having a positive electrode lead and a negative electrode lead protruding in opposite directions or a unidirectional pouch-shaped battery cell having a positive electrode lead and a negative electrode lead protruding in the same direction. Even though the battery cell shown in FIGS. 3A-3C is shown as a bidirectional battery cell having electrode leads 131 protruding in different directions, therefore, the shape of the pouch-shaped battery cell included in the present invention is not limited thereto. The plurality of battery cells 130 constituting the battery cell stack are stacked such that bottoms of electrode assembly receiving portions are perpendicular to a lower surface of the battery pack case.

That is, when comparing the battery pack according to the first embodiment and the battery pack according to the second embodiment with each other, the battery pack according to the second embodiment is different from the battery pack according to the first embodiment only in that the battery cell stack is disposed such that the bottoms of the electrode assembly receiving portions are perpendicular to the lower surface of the battery pack case.

Consequently, the description of the battery pack according to the first embodiment is equally applicable to the battery pack according to the second embodiment, except for the disposition direction of the battery cell stack. In addition, the same components of the second embodiment as the first embodiment may be denoted by the same reference numerals.

FIGS. 5A-5C a perspective view and a sectional view of a battery pack according to a third embodiment with a partial perspective view of a battery module, FIGS. 6A-6C a perspective view and a sectional view of a battery pack according to a fourth embodiment with a partial perspective view of a battery module, and FIG. 7 is an enlarged view of part B of FIG. 5B, schematically illustrating steps A-D in which thermal spread is inhibited when fire breaks out in the battery pack according to the third embodiment.

Referring to FIGS. 5A-7, each of the battery pack according to the third embodiment shown in FIGS. 5A-5C and the battery pack according to the fourth embodiment shown in FIG. 6A includes a battery cell stack constituted by a plurality of stacked battery cells 130, a battery module housing 101 configured to wrap the other outer surfaces of the battery cell stack excluding a first surface and a second surface, which are opposite end surfaces in an overall length direction thereof L, a water tank 200 configured to supply a coolant to the battery cell 130, and a battery pack case 100 configured to receive a plurality of battery module housings, wherein the battery pack case 100 includes a pack case space portion 110 located adjacent to the first surface and a crossbeam 120 located adjacent to the second surface.

The battery pack according to the third embodiment is identical in construction to the battery pack according to the first embodiment except that a metal band 150 is added to each of a first surface and a second surface of the battery module housing 101.

In the battery pack according to the third embodiment, metal bands 150 are attached to the first surface and the second surface so as to have a separation space therebetween, and the battery cells may be exposed through the separation space.

The battery pack according to the fourth embodiment shown in FIG. 6A is identical in construction to the battery pack according to the first embodiment except that an end cover 160 is added to each of the first surface and the second surface of the battery module housing 101 and that an opening 161 is formed in the end cover 160.

In the battery pack according to the fourth embodiment, the battery cells are exposed through the opening 161 formed in the end cover 160.

In the battery pack according to each of the third embodiment and the fourth embodiment, therefore, the coolant may be directly sprayed to the battery cell when the sealing member of the water tank adjacent thereto is melted to open the through-hole due to fire outbreak in the battery cell.

In addition, it is preferable for the separation space between the metal bands to be formed at a position corresponding to the sealing member in the battery pack according to the third embodiment and for the opening of the end cover to be formed at a position corresponding to the sealing member in the battery pack according to the fourth embodiment such that the sealing member is opened and thus the coolant is directly sprayed to the battery cell.

In the case in which a metal band is added to each of the first surface and the second surface of the battery module housing, as in the battery pack according to the third embodiment, and in the case in which an end cover having an opening formed therein is added to each of the first surface and the second surface of the battery module housing, as in the battery pack according to the fourth embodiment, it is possible to reduce the weight of the battery module and the battery pack, compared to the case in which an end cover is added. In addition, when fire breaks out in the battery cell, heat is not interrupted by the end cover, and it is possible to reduce the movement distance of thermal energy to the sealing member. Consequently, it is possible to rapidly melt the sealing member, and the coolant may be directly injected into the battery cell.

The thickness and number of the metal bands according to the third embodiment may be variously changed based on settings. When the metal band is formed so as to completely wrap the battery module housing, it is possible to prevent swelling of the battery cell stack due to charging and discharging of the battery cell.

Also, in the end cover having the opening formed therein, as in the fourth embodiment, the opening may have a size corresponding to one battery cell, or may have a size corresponding to a plurality of battery cells.

The opening may be formed in a circular shape, an oval shape, a polygonal shape, or a slit shape, or an end cover having a lattice pattern may be used.

The description of the battery pack according to the first embodiment is equally applicable to the battery pack according to each of the third embodiment and the fourth embodiment, except that the metal band or the end cover having the opening formed therein is added to each of the first surface and the second surface of the battery module housing. In addition, the same components of each of the third embodiment and the fourth embodiment as the first embodiment may be denoted by the same reference numerals.

Meanwhile, although FIG. 7 shows the battery pack according to the third embodiment in which the metal band is added to each of the first surface and the second surface, FIG. 7 may be the same as the vertical sectional view of the battery pack according to the fourth embodiment in the case in which the end cover 160 having the opening 161 formed therein is disposed at the position of the metal band 150 of FIG. 7.

FIGS. 8A-8C are a perspective view and a sectional view of a battery pack according to a fifth embodiment with a partial perspective view of a battery module, FIGS. 9A-9C are a perspective view and a sectional view of a battery pack according to a sixth embodiment with a partial perspective view of a battery module, and FIG. 10 is an enlarged view of part B of FIG. 8B, schematically illustrating steps A-D in which thermal spread is inhibited when fire breaks out in the battery pack according to the fifth embodiment.

Referring to FIGS. 8A to 10, each of the battery pack according to the fifth embodiment shown in FIGS. 8A-8C and the battery pack according to the sixth embodiment shown in FIGS. 9A-9C includes a battery cell stack constituted by a plurality of stacked battery cells 130, a battery module housing 101 configured to wrap the other outer surfaces of the battery cell stack excluding a first surface and a second surface, which are opposite end surfaces in an overall length direction thereof L, a water tank 200 configured to supply a coolant to the battery cell 130, and a battery pack case 100 configured to receive a plurality of battery module housings, wherein the battery pack case 100 includes a pack case space portion 110 located adjacent to the first surface and a crossbeam 120 located adjacent to the second surface.

In the battery pack according to each of the fifth embodiment and the sixth embodiment, the battery cells are stacked such that bottoms of electrode assembly receiving portions are perpendicular to a lower surface of the battery pack case.

That is, when comparing the battery pack according to the fifth embodiment shown in FIGS. 8A-8C and the battery pack according to the third embodiment shown in FIGS. 5A-C with each other and when comparing the battery pack according to the sixth embodiment shown in FIGS. 9A-9C and the battery pack according to the fourth embodiment shown in FIGS. 6A-6C with each other, the battery pack according to each of the fifth embodiment and the sixth embodiment is identical in construction to the battery pack according to a corresponding one of the third embodiment and the fourth embodiment except that the battery cell stack is disposed such that the bottoms of the electrode assembly receiving portions are perpendicular to the lower surface of the battery pack case.

Consequently, the description of the battery pack according to each of the third embodiment and the fourth embodiment is equally applicable to the battery pack according to a corresponding one of the fifth embodiment and the sixth embodiment, except for the disposition direction of the battery cell stack. In addition, the same components of each of the fifth embodiment and the sixth embodiment as a corresponding one of the third embodiment and the fourth embodiment may be denoted by the same reference numerals.

Meanwhile, although FIG. 10 shows the battery pack according to the fifth embodiment in which the metal band is added to each of the first surface and the second surface, FIG. 10 may be the same as the vertical sectional view of the battery pack according to the sixth embodiment in the case in which the end cover 160 having the opening 161 formed therein is disposed at the position of the metal band 150 of FIG. 10.

FIGS. 11A-11C are a perspective view and a sectional view of a battery pack according to a seventh embodiment with a partial perspective view of a battery module, and FIG. 12 is an enlarged view of part B of FIG. 11B, schematically illustrating steps A-D in which thermal spread is inhibited when fire breaks out in the battery pack according to the seventh embodiment.

Referring to FIGS. 11A-C and 12, the battery pack according to the seventh embodiment includes a battery cell stack constituted by a plurality of stacked battery cells 130, a battery module housing 101 configured to wrap the other outer surfaces of the battery cell stack excluding a first surface and a second surface, which are opposite end surfaces in an overall length direction thereof L, a water tank 200 configured to supply a coolant to the battery module housing 101, and a battery pack case 100 configured to receive a plurality of battery module housings, wherein the battery pack case 100 includes a pack case space portion 110 located adjacent to the first surface and a crossbeam 120 located adjacent to the second surface.

The battery cell 130 of FIGS. 11A-C and 12 may be a bidirectional pouch-shaped battery cell having a positive electrode lead and a negative electrode lead protruding in opposite directions or a unidirectional pouch-shaped battery cell having a positive electrode lead and a negative electrode lead protruding in the same direction. Even though the battery cell shown in FIGS. 11A-11C is shown as a bidirectional battery cell having electrode leads 131 protruding in different directions, therefore, the shape of the pouch-shaped battery cell included in the present invention is not limited thereto. The plurality of battery cells 130 constituting the battery cell stack is stacked such that bottoms of electrode assembly receiving portions are parallel to a lower surface of the battery pack case.

In the battery module housing configured to wrap the outer surface of the battery cell stack constituted by the plurality of stacked battery cells 130, an end cover 170 is added to each of the first surface and the second surface, from which the electrode leads 131 protrude, wherein the end cover 170 has no separate opening formed therein, and therefore the battery module housing is hermetically sealed by the end covers 170.

When the temperature of a battery cell 130' is increased due to fire outbreak, heat is transferred to the pack case space portion 110 and the crossbeam 120 adjacent thereto, and the sealing member 210 adjacent to the ignited battery cell 130' is melted to open the through-hole 220 of the water tank 200. Since the battery module housing 101 is hermetically sealed by the end covers 170, however, the coolant in the first water tank 200 included in the pack case space portion 110 and the second water tank 200 included in the crossbeam 120 cannot be directly sprayed to the battery cell 130 but can be directly sprayed only to the outer surface of the battery module housing 101.

That is, in the case in which the hermetically sealed battery module housing 101 is used, the coolant in the water tank is sprayed to the outer surface of the battery module housing 101, whereby it is possible to exhibit an effect of preventing or delaying thermal spread to battery modules adjacent thereto.

When comparing the battery pack according to the seventh embodiment and the battery pack according to the first embodiment with each other, the battery pack according to the seventh embodiment is different from the battery pack according to the first embodiment only in that the end cover is added to each of the first surface and the second surface of the battery module housing in order to hermetically seal the battery module.

In the battery pack according to the seventh embodiment, therefore, the coolant is sprayed to the outer surface of the battery module housing when the water tank is opened. In the battery pack according to the first embodiment, however, the coolant in the water tank is directly sprayed to the battery cell.

Consequently, the description of the first embodiment in terms of the water tank, the sealing member, and the through-hole is equally applicable to the battery pack according to the seventh embodiment. In addition, the same components of the seventh embodiment as the first embodiment may be denoted by the same reference numerals.

FIGS. 13A-13C are a perspective view and a sectional view of a battery pack according to an eighth embodiment with a partial perspective view of a battery module, and FIG. 14 is an enlarged view of part B of FIG. 11B, schematically illustrating steps A-D in which thermal spread is inhibited when fire breaks out in the battery pack according to the eighth embodiment.

Referring to FIGS. 13A-C and 14, the battery pack according to the eighth embodiment includes a battery cell stack constituted by a plurality of stacked battery cells 130, a battery module housing 101 configured to wrap the other outer surfaces of the battery cell stack excluding a first surface and a second surface, which are opposite end surfaces in an overall length direction thereof L, a water tank 200 configured to supply a coolant to the battery cell 130, and a battery pack case 100 configured to receive a plurality of battery module housings, wherein the battery pack case 100 includes a pack case space portion 110 located adjacent to the first surface and a crossbeam 120 located adjacent to the second surface.

In the battery pack according to the eighth embodiment, the battery cell stack is disposed such that bottoms of electrode assembly receiving portions are perpendicular to a lower surface of the battery pack case.

That is, when comparing the battery pack according to the eighth embodiment and the battery pack according to the seventh embodiment with each other, the battery pack according to the eighth embodiment is different from the battery pack according to the seventh embodiment only in that the battery cell stack is disposed such that the bottoms of the electrode assembly receiving portions are perpendicular to the lower surface of the battery pack case.

Consequently, the description of the battery pack according to the seventh embodiment and the description of the battery pack according to the first embodiment recited in the battery pack according to the seventh embodiment are equally applicable to the battery pack according to the eighth embodiment, except for the disposition direction of the battery cell stack. In addition, the same components of the eighth embodiment as the seventh embodiment may be denoted by the same reference numerals.

Those skilled in the art to which the present invention pertains will appreciate that various applications and modifications are possible within the category of the present invention based on the above description.

DESCRIPTION OF REFERENCE NUMERALS

100: Battery pack case
101: Battery module housing
110: Pack case space portion
120: Crossbeam
130, 130': Battery cells
131: Electrode lead
140: Battery module
150: Metal band
160, 170: End covers
161: Opening
200: Water tank
210: Sealing member
220: Through-hole

The invention claimed is:

1. A battery pack comprising:
a plurality of battery cell stacks, each battery cell stack constituted by a plurality of stacked battery cells and having a top surface, a bottom surface, a pair of side surfaces, and a pair of end surfaces;
a plurality of battery module housings, each battery module housing having a top surface, a bottom surface and a pair of side surfaces configured to wrap the top surface, the bottom surface and the pair of sides surfaces of a respective one of the plurality of battery cell stacks and having open ends in an overall length direction;
a water tank configured to supply a coolant to at least one of the plurality of battery module housings; and
a battery pack case configured to receive the plurality of battery module housings, wherein the battery pack case comprises:
a pack case space portion located adjacent to a first side of a first battery module housing of the plurality of battery module housings; and
a crossbeam located adjacent to a second side of the first battery module housing.

2. The battery pack according to claim 1, wherein each battery cell stack is disposed such that bottoms of electrode assembly receiving portions are parallel to a lower surface of the battery pack case.

3. The battery pack according to claim 1, wherein each battery cell stack is disposed such that bottoms of electrode assembly receiving portions are perpendicular to a lower surface of the battery pack case.

4. The battery pack according to claim 1, wherein the water tank comprises a first water tank and a second water tank, and
wherein the pack case space portion comprises the first water tank and the crossbeam comprises the second water tank.

5. The battery pack according to claim 1, wherein a through-hole is formed in each of one surface of the pack case space portion that faces the first side of the first battery module housing and one surface of the crossbeam that faces the second side of the first battery module housing, and
wherein a sealing member is added to the through-hole.

6. The battery pack according to claim 5, wherein the sealing member is made of a material that is melted by high-temperature gas or sparks discharged from the first battery module housing.

7. The battery pack according to claim 6, wherein each through-hole is opened as a result of melting of the sealing member, and
wherein a coolant in the water tank is sprayed through each through-hole.

8. The battery pack according to claim 5, wherein each through-hole is a plurality of holes formed so as to be uniformly dispersed.

9. The battery pack according to claim 1, wherein at least a portion of each of the first side of the first battery module housing and the second side of the first battery module housing is open.

10. The battery pack according to claim 9, wherein a separation space is formed between the first battery module housing and the pack case space portion or between the first battery module housing and the crossbeam.

11. The battery pack according to claim 9, wherein a metal band is added to each of the first side of the first battery module housing and the second side of the first battery module housing.

12. The battery pack according to claim 9, wherein an end cover is added to each of the first side of the first battery module housing and the second side of the first battery module housing, and wherein an opening is formed in the end cover.

13. The battery pack according to claim 1, wherein an end cover is added to each of the first side of the first battery module housing and the second side of the first battery module housing, and
wherein the battery module housing is hermetically sealed by the end covers.

* * * * *